United States Patent [19]

Oosterhouse

[11] 4,180,802
[45] Dec. 25, 1979

[54] RANDOM AUTOPLAY

[75] Inventor: Gerard J. Oosterhouse, Grand Rapids, Mich.

[73] Assignee: Rowe International, Inc., Whippany, N.J.

[21] Appl. No.: 885,572

[22] Filed: Mar. 13, 1978

[51] Int. Cl.² .................. G11B 19/08; G06F 11/00; H04Q 9/14

[52] U.S. Cl. ............... 340/162; 340/323 R; 194/15

[58] Field of Search ............ 340/162, 323; 194/15; 274/10 R

[56] References Cited

U.S. PATENT DOCUMENTS 3,653,026  3/1972  Hurley ........................ 340/323
3,964,025  6/1976  Oosterhouse ................ 340/162
4,091,437  5/1978  Soroka ........................ 340/162

Primary Examiner—Donald J. Yusko
Attorney, Agent, or Firm—Shenier & O'Connor

[57] ABSTRACT

An automatic selector unit for repetitively actuating an automatic phonograph to play randomly selected records includes a first timer for measuring the elapsed time since a previous play and a continuously running second timer for generating periodic pulses. The unit actuates the scanning mechanism of the phonograph after a predetermined elapsed time to bring different records successively into position for play and thereafter actuates the player mechanism on the next pulse from the second timer to play the record then in position for play.

15 Claims, 2 Drawing Figures

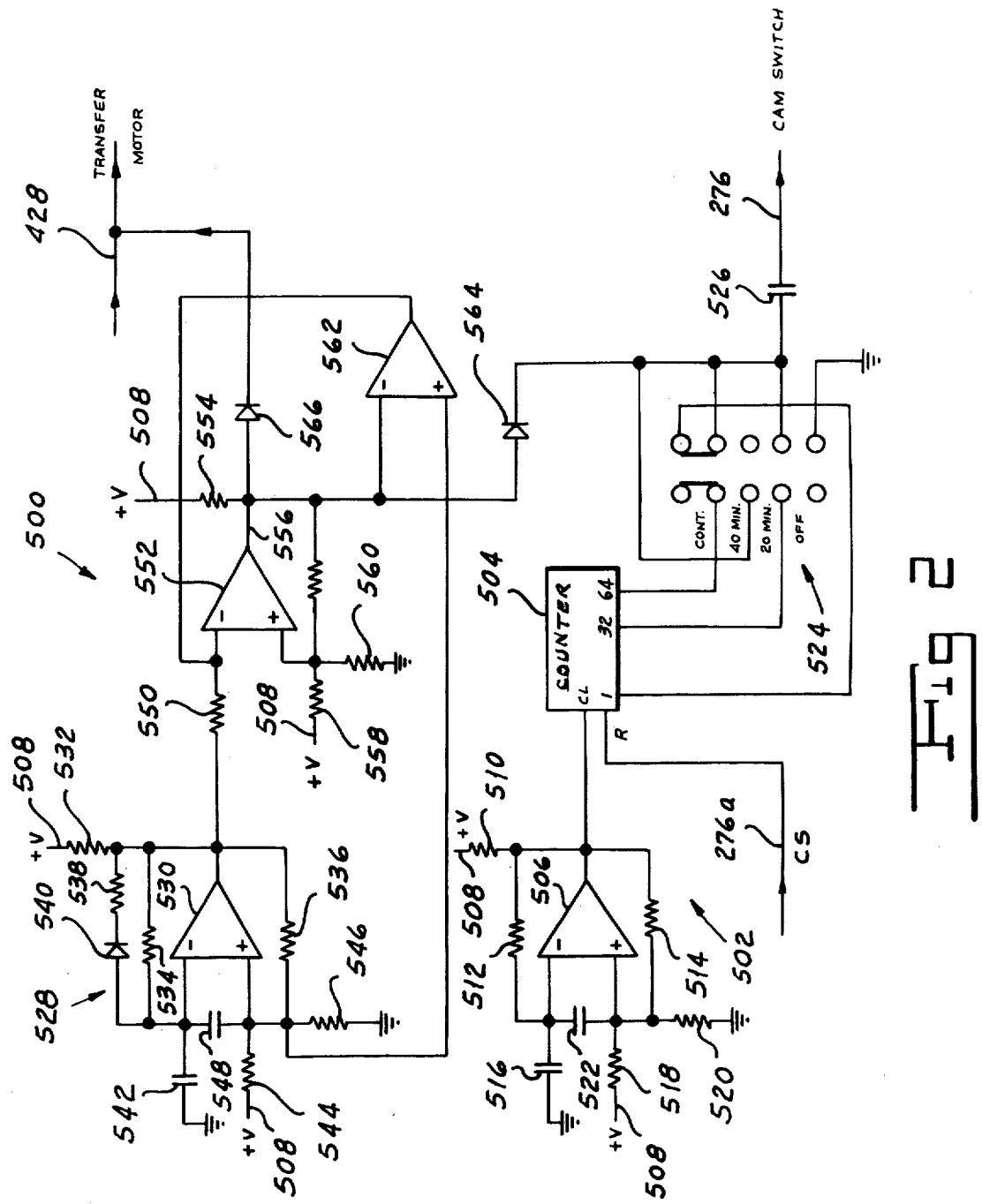

RANDOM AUTOPLAY

BACKGROUND OF THE INVENTION

Often it is desirable in an automatic music system, such as a jukebox system, to be able to play recordings independently of selections provided by users. Such a capability not only calls attention to the system to encourage users to make selections, but also provides an emergency backup if the selection part of the system becomes inoperative. Previous systems for playing recordings independently of user selections play the recordings in a fixed or preprogrammed sequence, resulting in a generally monotonous, and thus unsatisfactory performance.

SUMMARY OF THE INVENTION

One of the objects of my invention is to provide a selector unit for an automatic music system which is capable of selecting recordings independently of selections provided by users.

Another object of my invention is to provide a selector unit which allows the music system to attract the attention of potential users to encourage use of the system.

Still another object of my invention is to provide a selector unit which serves as a backup selection system.

A further object of my invention is to provide a selector unit which selects a pleasing sequence of recordings.

Still another object of my invention is to provide a selector unit which is reliable and compatible with existing systems.

Other and further objects of my invention will be apparent from the following description.

In general, my invention contemplates, in a system having a player unit for playing a selected one of a plurality of musical recordings, means for automatically actuating the player unit to play a randomly selected one of the recordings. Preferably the actuating means includes a first timer for measuring the elapsed time since a previous play and a continuously running second timer for generating periodic triggering signals. After a predetermined elapsed time, as determined by the first timer, the scanning mechanism of the phonograph is actuated to bring different records successively into position for play. Thereafter, on the next triggering pulse from the second timer, the player mechanism is actuated to play the record then in position for play.

BRIEF DESCRIPTION OF THE DRAWINGS

In the accompanying drawings to which reference is made in the instant specification and in which like reference characters are used to indicate like parts in the various views:

FIG. 2 is a schematic diagram of the internal circuitry of the random play unit shown in FIG. 1.

DESCRIPTION OF THE PREFERRED EMBODIMENT

Figure 1:
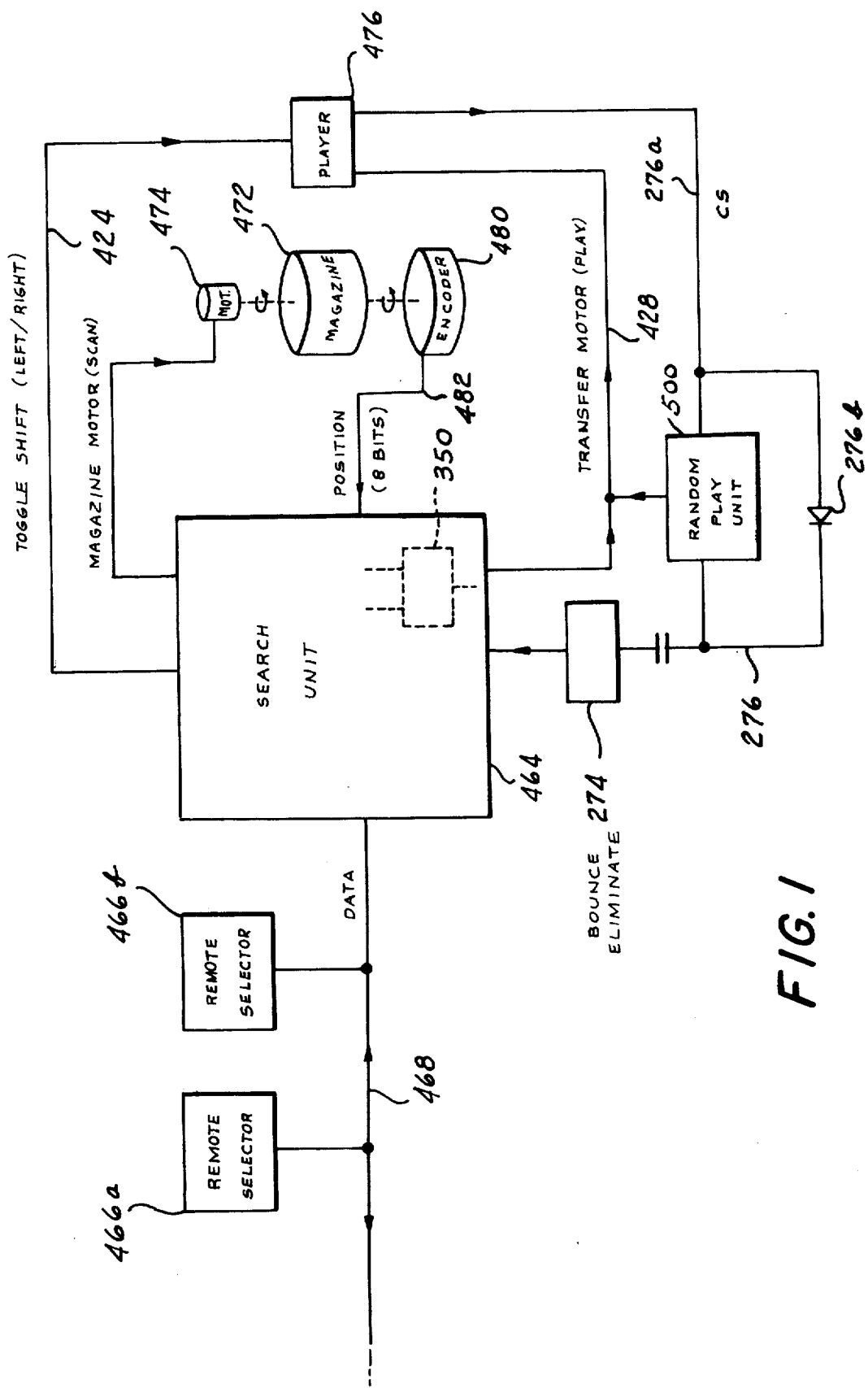
FIG. 1 is an overall block diagram of the automatic phonograph system in which may random play unit is used.

Referring now to FIG. 1, the automatic phonograph system in which the random selector or play unit is used includes a storage and search unit 464 (hereinafter referred to simply as the "search unit") containing a 200-bit memory 350 whose locations correspond to the selections offered. Search unit 464 is described in detail in U.S. Pat. No. 3,964,025, the disclosure of which patent is incorporated by reference. In the preferred embodiment, selections are numbered from 100 to 299, the first digit representing the side of the record, the second and third digits representing the position of the record in the magazine. The search unit 464 is connected to a plurality of remote user-actuated selector units, two of which, selectors 466a and 466b, are shown, by a "data" line 468. The selectors used herein are described at length in U.S. Pat. No. 3,891,970, the disclosure of which patent is incorporated by reference. Selection identification numbers are transmitted to and from the search unit 464 in the form of a 10-bit pulse train on data line 468. Of this pulse train the first two bits represent the first digit, the third through sixth bits represent the second digit, and the seventh through tenth bits represent the third digit.

In the normal mode of operation of the search unit 464, signal trains representing the record being played are periodically transmitted to the selectors 466a and 466b, where they are used to light a digital display of the selection identification number. When a customer actuates a selector in making a selection, the selector waits until a break occurs between the "record being played" pulse trains and then transmits a single 10-bit pulse train representing the selection choice to the search unit. Upon receiving such a pulse train, the search unit 464 interrupts its normal mode of operation and enters a "write" mode in which it inhibits transmitting and stores a play signal in memory 350 at a location corresponding to the number received.

The search unit 464 is also coupled to the record playing mechanism, the main components of which are a record magazine 472, which rotates on an axis in response to energization of a motor 474, and a player assembly 476. The magazine 472 may in this particular embodiment contain up to 100 records. Different records are brought into position for play upon energization of motor 474 to change the orientation of the magazine with respect to the player assembly 476. The motor 474 is energized in response to a "magazine motor" signal on a line 426 originating at the search unit 464. Also coupled to the magazine is an encoding wheel 480, which provides an output to the search unit 464 consisting of an 8-bit binary coded representation of the magazine number of the record in position for play. This signal is carried on eight lines indicated collectively as a channel 482.

A "CS" line 276a leading from the player assembly 476 is normally at a low logic level, but changes to a high logic level shortly after the assembly 476 is energized and remains at such a level while the record is being played. Line 276 is coupled through a diode 276b to a "cam switch" line 276 feeding a "bounce eliminate" circuit 274. Circuit 274 normally supplies a high output to search unit 464 but supplies a short low-level pulse to the unit in response to a negative level change on line 276.

Search unit 464 provides the player assembly 16 with "transfer motor" and "toggle shift" signals on lines 428 and 424, respectively. When a signal appears on line 428, the playing assembly stops the magazine 472 and plays either the left side or the right side of the record then in position, in accordance with the polarity of the signal on line 424. At the end of a record, bounce eliminate circuit 274 responds to the negative level change on line 276 by providing a low-level pulse to the search unit 464.

In its normal mode of operation, the search unit 464 alternates between scanning and playing. The search unit 464 scans by providing a signal on line 426 only, thereby rotating the record magazine 472, and reading, sequentially, the memory locations (both right side and left side) corresponding to the position signal on line 482. When a play signal, or signal corresponding to a selected recording, is found, the search unit 464 generates a signal on line 424 indicating that side of the record for which the play signal was found. At the same time a signal on line 428 from the search unit 464 stops the magazine and causes the selected recording to be played. When the selection is over, the search unit 464 responds to the negative level change on line 276 by resetting the transfer motor signal on line 428, allowing scanning to resume. The signal on line 426 is itself reset if the entire magazine 472 has been scanned without finding a play signal. The magazine motor signal reappears on line 426 to start a new scan when a selector unit 466a or 466b is again actuated and a play signal is loaded into the appropriate location of memory 350.

Referring now to FIG. 2, the random play unit 500 includes a first timing circuit, indicated generally by the reference character 502, for timing the period since the last recording has been played. In the circuit 502, a counter 504 receives a clock input from a comparator 506 used as a square wave oscillator. I couple the output of comparator 506, an open collector output, to a positive DC voltage line 508 through a resistor 510 and to the inverting and noninverting inputs, respectively, through resistors 512 and 514. The inverting input of comparator 506 is also coupled to ground through capacitor 516, while the noninverting input is coupled to line 508 and to ground through resistors 518 and 520, respectively. A capacitor 522 also couples the inverting and noninverting inputs of comparator 506.

Comparator 506 functions as an astable multivibrator providing a square wave output to counter 504. In the circuit shown, resistor 502 and capacitor 516, which constitute the timing elements of the multivibrator, are selected to provide a square wave having a period of about 40 seconds.

When a record is being played, the CS line 276a is a high logic level, keeping the counter 504 reset. When the player 476 has finished playing a record, it provides a low signal on line 276a, allowing the counter 504 to be clocked by the multivibrator 506. I connect various outputs of the counter 504 to the contacts of a four-position slide switch 524 to provide a manually selectable time interval after the end of a record from zero to approximately 40 minutes. More particularly, when the switch 524 is in a first, or continuous, position, the 1's place output of counter 504 is coupled through a capacitor 506 to the cam switch line 276. Capacitor 526 differentiates the step output from the 1's place output of the counter 504, providing a pulse signal on line 276. The search unit 464 responds to this signal in the manner previously described by generating a magazine motor signal on line 426, energizing motor 474 to move the record magazine 472 to bring successive records into position for play. In a manner described in detail in the previously mentioned patents, U.S. Pat. Nos. 3,891,970 and 3,964,025, search unit 464 also transmits a signal on line 468 indicating the position of the record magazine 472. Selector units 466a and 466b respond to this signal by displaying the number of the record currently in position for play.

In a similar manner, movement of the switch 524 to the next, or "40 minute," position couples the 64's place output of counter 504 to capacitor 526 to produce a pulse output on line 276 approximately 40 minutes after a record has finished being played. In the next, or "20 minute," position of the switch 524, the 32's place output of counter 504 is coupled to capacitor 526 to produce a signal on line 276 after about 20 minutes. In the final, or "off," position of the switch 524, capacitor 526 is simply connected to ground to disable the random play unit 500.

Referring now to the second timing circuit, indicated generally by the reference character 528, I use a second comparator 530 in an astable multivibrator circuit similar to that of comparator 506. Specifically, I couple the open collector output of comparator 530 to the positive line 508 through a resistor 532 and to the inverting and noninverting inputs, respectively, through resistors 534 and 536. I also apply the output of comparator 532 to the inverting input through series-connected resistor 538 and diode 540 to provide an asymmetric pulse. A capacitor 542 provides a path between the inverting input of comparator 532 and ground, while respective resistors 544 and 546 connect the noninverting input to line 508 and to ground, respectively.

Comparator 532 functions as an asymmetric astable multivibrator in which capacitor 542 is charged through resistor 534 and is discharged through the parallel combination of resistors 534 and 538. Resistors 534 and 538 and capacitor 542 are so selected as to provide a high multivibrator output for the time required for a complete scan of the record magazine 472 (about 7 seconds in the embodiment shown) and a low multivibrator output for a much briefer duration—for example, about 0.1 second. Comparator 530 thus provides a short low-level pulse approximately every 7 seconds.

I apply the output of comparator 530 through a resistor 550 to the inverting input of another comparator 552. Comparator 552 in turn has its open collector output connected to the supply line 508 through resistor 554, to its noninverting input through resistor 556, and to the output line from switch 524 through diode 564. I also couple the noninverting input of comparator 552 to the supply line 508 through resistor 558 and to ground through resistor 560.

Normally, the output line from switch 524 is at ground potential. This potential is applied through diode 564 to hold the output of comparator 552 at a low logic level, regardless of the signals applied to its inputs. When, in the manner described above, counter 504 has counted to a sufficiently high number, as determined by the position of the switch 524, the switch output goes positive, allowing the output of comparator 552 to rise to a high logic level in response to a low-level pulse from comparator 530.

The high-level output from comparator 552 is applied through an isolating diode 566 to the transfer motor line 428 to actuate the player 476, causing it to arrest the motion of the record magazine and play the record currently in position for play. A fourth comparator 562, the noninverting input of which is tied to the noninverting input of comparator 530, inverts the output of comparator 552 and applies it to the inverting input to complete a positive feedback loop. Comparator 552 remains at a high logic level until the counter 504 is reset by a CS signal generated on line 276a when the record begins playing. The CS signal on line 276a holds counter 504 at reset until the record has finished playing and line 276a changes back to ground potential. At this point, counter 504 is again allowed to count in response to the square wave signal generated by comparator 506, and the operation of the random play unit 500 in the manner described above is repeated.

Since the unit 500 is, in effect, connected in parallel with the existing search unit 464 and associated elements, the normal operation of the search unit in response to signals from the selector units 466a, 466b or the player 476 remains unaffected. Thus, the magazine 426 is also scanned when a play signal is loaded into the memory 350 following actuation of a selector unit 466a or 466b or immediately following the playing of a record. Random play unit 500 only comes into operation when a sufficient time elapses after the playing of a record to permit counter 504 to reach a preselected count.

It will be seen that I have accomplished the objects of my invention. My random play unit actuates the automatic phonograph to play selections independently of selections provided by users, thereby providing a backup system and also encouraging potential users to make selections. Since the records played are selected at random, the sequence of records played is unpredictable and thus pleasing. Finally, my unit, which uses no mechanical components and which in effect bypasses the memory of the phonograph search unit, is compatible with existing systems and is highly reliable.

It will be understood that certain features and subcombinations are of utility and may be employed without reference to other features and subcombinations. This is contemplated by and is within the scope of my claims. It is further obvious that various changes may be made in details within the scope of claims without departing from the spirit of my invention. It is, therefore, to be understood that my invention is not to be limited to the specific details shown and described.

Having thus described my invention, what I claim is:

1. In a system having a user-actuated selector means for selecting one of a plurality of musical recordings, a memory having locations corresponding to said recordings, means responsive to said selector means for storing a signal in the memory location corresponding to said selected recording, means for searching said memory for a location containing said signal, and means responsive to said searching means for playing the recording corresponding to said location, the improvement comprising means independent of said memory for playing a randomly selected one of said recordings.

2. In a system for playing automatically one of a plurality of music recordings, said system having scanning means for bringing different recordings successively into position for playing and player means for playing the recording then in position for play, apparatus comprising first means for automatically actuating said scanning means and second means for actuating said player means a randomly selected period of time after actuation of said scanning means by said first means, said first means comprising a counter, means for periodically incrementing said counter, means for inhibiting said counter while said player means in playing a record, and means for actuating said scanning means when said counter has reached a predetermined count, said second means comprising means for generating a periodic timing signal, sensor means responsive to said timing signal for actuating said player means, and means responsive to said first means for enabling said sensor means, said timing signal means running asynchronously with said incrementing means.

3. In a system for playing automatically one of a plurality of music recordings, said system having scanning means for bringing different recordings successively into position for play and player means for playing the recording then in position for play, apparatus comprising first means for automatically actuating said scanning means and second means for actuating said player means a randomly selected period of time after actuation of said scanning means by said first means, said first means comprising a counter, means for periodically incrementing said counter, means for inhibiting said counter while said playing means is playing a record, and means for actuating said scanning means when said counter has reached a predetermined count, said second means comprising means for generating a periodic timing signal, sensor means responsive to said timing signal for actuating said player means, and means responsive to said first means for enabling said sensor means.

4. In a system for playing automatically one of a plurality of music recordings, said system having scanning means for bringing different recordings successively into position for play and player means for playing the recording then in position for play, apparatus comprising first means for automatically actuating said scanning means and second means for actuating said player means a randomly selected period of time after actuation of said scanning means by said first means, said first means comprising a counter, means for periodically incrementing said counter, means for inhibiting said counter while said player means is playing a record, and means for actuating said scanning means when said counter has reached a predetermined count.

5. In a system for playing automatically one of a plurality of music recordings, said system having scanning means for bringing different recordings successively into position for play and player means for playing the recording then in position for play, apparatus comprising first means for automatically actuating said scanning means and second means for actuating said player means a randomly selected period of time after actuation of said scanning means by said first means, said first means actuating said scanning means a preselected period of time after the playing of a recording by said player means.

6. In a system for playing automatically one of a plurality of music recordings, said system having scanning means for bringing different recordings successively into position for play and player means for playing the recording then in position for play, apparatus comprising first means for automatically actuating said scanning means and second means for actuating said player means a randomly selected period of time after actuation of said scanning means by said first means.

7. In a system for playing automatically one of a plurality of music recordings, said system having scanning means for bringing different recordings successively into position for play and player means for playing the recording then in position for play, apparatus comprising first means for automatically actuating said scanning means to bring a randomly selected one of said recordings into position for play and second means for automatically actuating said player means to play said randomly selected recording, said second means comprising a counter, means for periodically incrementing said counter, means for inhibiting said counter while said playing means is playing a record, and means for actuating said scanning means after said counter has reached a predetermined count, said counter having plurality of outputs corresponding to different counts, said means for actuating said scanning means comprising means for manually selecting from among said counter outputs.

8. In a system for playing automatically one of a plurality of music recordings, said system having scanning means for bringing different recordings successively into position for play and player means for playing the recording then in position for play, apparatus comprising first means for automatically actuating said scanning means to bring a randomly selected one of said recordings into position for play and second means for automatically actuating said player means to play said randomly selected recording, said second means comprising a counter, means for periodically incrementing said counter, means for inhibiting said counter while said playing means is playing a record, and means for actuating said scanning means after said counter has reached a predetermined count.

9. In a system for playing automatically one of a plurality of music recordings, said system having scanning means for bringing different recordings successively into position for play and player means for playing the recording then in position for play, apparatus comprising first means for automatically actuating said scanning means to bring a randomly selected one of said recordings into position for play and second means for automatically actuating said player means to play said randomly selected recording, said second means actuating said player means a predetermined period of time after the playing of a recording by said player means.

10. In a system for playing automatically one of a plurality of music recordings, said system having scanning means for bringing different recordings successively into position for play and player means for playing the recording then in position for play, apparatus comprising first means for automatically actuating said scanning means to bring a randomly selected one of said recordings into position for play and second means for automatically actuating said player means to play said randomly selected recording.

11. In a system having a user-actuated selector means for selecting one of a plurality of storage elements containing musical recordings and player means responsive to said selector means for playing a recording on said selected storage element, the improvement comprising means for actuating said player means to play a recording on an element selected randomly from the entire plurality of said elements.

12. In a system having player means for playing a selected one of a plurality of musical recordings, the improvement comprising means for automatically actuating said player means to play a randomly selected one of said recordings, said actuating means actuating said player means a preselected period of time after said player means has played a recording, said improvement comprising means for manually setting said period, said system including a user-actuated selector means for selecting one of said plurality of musical recordings and means responsive to said selector means for actuating said player means to play said selected recording, said automatic actuating means operating in the absence of user actuation of said selector means.

13. In a system having player means for playing a selected one of a plurality of musical recordings, the improvement comprising means for automatically actuating said player means to play a randomly selected one of said recordings, said actuating means actuating said player means a preselected period of time after said player means has played a recording, said improvement including means for manually setting said time period.

14. In a system having player means for playing a selected one of a plurality of musical recordings, the improvement comprising means for automatically actuating said player means to play a randomly selected one of said recordings, said actuating means actuating said player means a preselected period of time after said player means has played a recording.

15. In a system having player means for playing a selected one of a plurality of musical recordings, the improvement comprising means for automatically actuating said player means to play a randomly selected one of said recordings.

* * * * *